_United States Patent_ [19]

Williams, Jr.

[11] Patent Number: 4,588,805

[45] Date of Patent: May 13, 1986

[54] SULFONATE-TERMINATED POLYIMIDES AND POLYAMIC ACIDS AND METHOD FOR THEIR PREPARATION

[75] Inventor: Robert E. Williams, Jr., Scotia, N.Y.

[73] Assignee: General Electric Company, Schenectady, N.Y.

[21] Appl. No.: 647,596

[22] Filed: Sep. 6, 1984

[51] Int. Cl.$^4$ .............................................. C08G 73/10
[52] U.S. Cl. ...................................... 528/172; 528/26; 528/125; 528/126; 528/128; 528/180; 528/185; 528/220; 528/226; 528/229; 528/352; 528/353
[58] Field of Search ............... 528/125, 126, 128, 172, 528/180, 182, 185, 188, 352, 353, 26, 220, 226, 229

[56] References Cited

U.S. PATENT DOCUMENTS

| | | |
|---|---|---|
| 3,890,274 | 6/1975 | D'Alelio .............................. 528/352 |
| 3,998,786 | 12/1976 | D'Alelio .............................. 528/352 |
| 4,206,106 | 6/1980 | Heilman et al. ..................... 528/172 |
| 4,251,418 | 2/1981 | Chow et al. ......................... 528/172 |
| 4,251,420 | 2/1981 | Antonoplos et al. ............... 528/172 |
| 4,255,313 | 3/1981 | Antonoplos et al. ............... 528/172 |
| 4,469,860 | 9/1984 | Rosenquist ......................... 528/196 |
| 4,499,252 | 2/1985 | Igarashi et al. ..................... 528/172 |

_Primary Examiner_—Lester L. Lee
_Attorney, Agent, or Firm_—William H. Pittman; James C. Davis, Jr.; James Magee, Jr.

[57] ABSTRACT

Sulfonate-terminated polyimides and polyamic acids are prepared by the reaction of a dianhydride such as bisphenol A dianhydride, a diamine such as m-phenylenediamine or bis(4-aminophenyl)methane, and an amino sulfonic acid such as p- or m-aminobenzenesulfonic acid or 2-aminoethanesulfonic acid. The products may be used as compatibilizing agents for blends of aromatic polymers with ionomeric elastomers.

20 Claims, 1 Drawing Figure

(I)
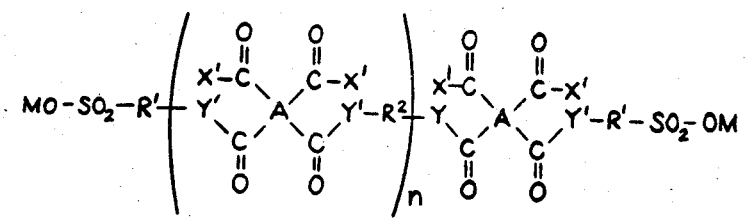
(II)
A(COOH)₄
(III)
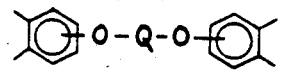
(IV)
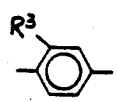
(V)
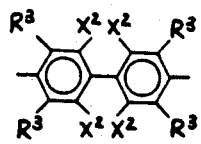
(VI)
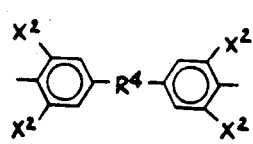
(VII)
H₂N—R²—NH₂
(VIII)
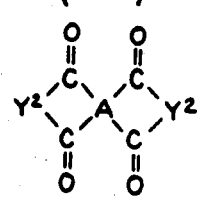
(IX)
H₂N—R'—SO₃H
(X)
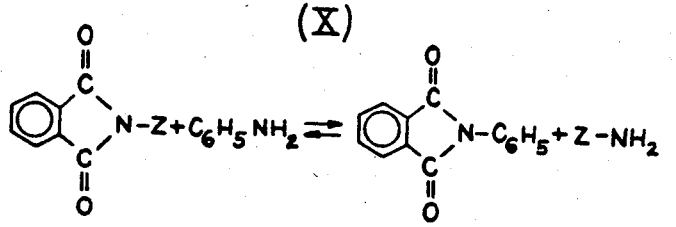

SULFONATE-TERMINATED POLYIMIDES AND POLYAMIC ACIDS AND METHOD FOR THEIR PREPARATION

This invention relates to ionomeric polyimides and polyamic acids, and more particularly to sulfonated polymers of this type and a method for their preparation.

Polyimides, generally prepared by the reaction of tetracarboxylic acids or their dianhydrides with diamines, are a well known class of condensation polymers usually characterized by high thermal stability and solvent resistance. They include the class of polyetherimides which are prepared from dianhydrides containing ether groups, most often from 2,2-bis[4-(3,4-dicarboxyphenoxy)phenyl]propane dianhydride (hereinafter "bisphenol A dianhydride"). The corresponding polyamic acids are frequently used as intermediates in polyimide preparation.

Ionomers, or polymers containing ionic substituents, are also well known and find utility in a number of applications. In particular, it has been found that the impact resistance of many aromatic polymers can be improved by blending them with an ionomer such as a sulfonated elastomer and, as a compatibilizing agent, an ionomeric aromatic polymer similar to the base polymer. Reference is made, for example, to copending, commonly assigned applications Ser. Nos. 619,431 and 619,433, both filed June 11, 1984, the disclosures of which are incorporated by reference herein. In view of the foregoing, it is of interest to prepare ionomeric polyimides and in particular sulfonated polyimides.

A principal object of the present invention, therefore, is to provide ionomeric polyimides and polyamic acids and a method for their preparation.

A further object is to provide sulfonated polymers of this type which may be prepared by a relatively simple method and which have potential for use in a wide variety of ionomer applications, including those requiring ionomers.

Other objects will in part be obvious and will in part appear hereinafter.

In one of its aspects, the present invention is directed to sulfonate-terminated polymers having formula I in the drawings, wherein M is one equivalent of a cation; A is a tetravalent aromatic radical; $R_1$ is a divalent aliphatic or aromatic radical; $R^2$ is an aromatic hydrocarbon radical containing about 6–20 carbon atoms or a halogenated derivative thereof, an alkylene or cycloalkylene radical containing about 2–20 carbon atoms, or a bis-alkylenepoly(dialkylsiloxane) radical; in each individual instance, $X^1$ is OH and $Y^1$ is NH, or $X^1$ and $Y^1$ taken together are N; and n is at least about 5.

As indicated by formula I, the sulfonate-terminated polymers of this invention may be sulfonic acids, wherein M is hydrogen, or salts, wherein M may be a metal cation such as sodium, potassium, calcium, zinc, ammonium, an amine cation or a quaternary ammonium cation. Preferably, M is hydrogen, sodium or zinc.

The A value is a tetravalent aromatic radical, which may be considered as being derived from a tetracarboxylic acid having formula II. Suitable acids of this type include pyromellitic acid, 3,4,3',4'-diphenyltetracarboxylic acid, bis(3,4-dicarboxylphenyl) ketone, bis(3,4-dicarboxyphenyl) sulfide and bis(3,4-dicarboxyphenyl) sulfone. Mixtures of A values may also be present in the sulfonate-terminated polymers of this invention.

The preferred A values are those having formula III, wherein Q is a divalent aromatic radical, which may be attached through oxygen to the aromatic rings in the 3- or 4- positions, preferably the 4-positions, with respect to the free valence bonds. Illustrative Q radicals of this type are derived from such compounds as resorcinol, hydroquinone, 4,4'-dihydroxybiphenyl, 4,4'-dihydroxy-3,3',5,5'-tetramethylbiphenyl, 4,4'-dihydroxydiphenylmethane, 3,4'-dihydroxydiphenylmethane, 2,2-bis(2-hydroxyphenyl)propane, 2,2-bis(4-hydroxyphenyl)propane ("bisphenol A"), 2-(3-hydroxyphenyl)-2-(4-hydroxphenyl)propane, 1,1-bis(4-hydroxyphenyl)ethane, 2,2-bis(4-hydroxyphenyl)pentane, 4,4'-dihydroxybenzophenone, bis(4-hydroxyphenyl) ether, bis(4-hydroxyphenyl) sulfide, bis(4-hydroxyphenyl) sulfoxide, bis(4-hydroxyphenyl) sulfone and 3-hydroxyphenyl 4-hydroxyphenyl sulfone.

The most preferred Q values are those having formulas IV, V and VI, wherein each $R^3$ is independently hydrogen or methyl, $R^4$ is a straight chain or branched alkylene radical containing 1–5 carbon atoms and is most often the isopropylidene radical, and each $X^2$ is independently hydrogen or halogen (usually chlorine or bromine). Especially desirable is the radical derived from bisphenol A by the removal of both hydroxy groups therefrom, and having formula VI wherein $R^3$ is isopropylidene and each $X^2$ is hydrogen.

The $R^1$ value is a divalent aliphatic or aromatic radical. It is usually a hydrocarbon and especially a lower hydrocarbon radical (the word "lower" meaning that it contains up to 7 carbon atoms), although it may contain substituents which do not substantially affect character or reactivity in the context of this invention. Illustrative hydrocarbon radicals of this type are m-phenylene, p-phenylene, ethylene, propylene, 1-methylpropylene and trimethylene. When $R^1$ is an aromatic radical, the free valence bonds are usually in the meta positions. The $R^1$ value is most often alkylene and preferably an alkylene radical containing up to about 4 carbon atoms wherein the free valence bonds are attached to vicinal carbon atoms. The ethylene radical is especially preferred.

The $R^2$ value is as previously defined and may be considered as being derived from a diamine of formula VII. Examples of suitable $R^2$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptamethylenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethylbenzidine, 3,3'-dimethoxybenzidine, 1,5-diaminonaphthalene, bis(4-aminophenyl)methane, bis(4-aminophenyl)propane, 2,4-bis(β-amino-t-butyl)toluene, bis(p-β-methyl-o-aminopentyl)benzene, 1,3-diamino-4-isopropylbenzene, bis(4-aminophenyl) sulfone, bis(4-aminophenyl) ether and 1,3-bis(3-aminopropyl)tetramethyldisiloxane. Mixtures of these $R^2$ values may also be present. Preferably, $R^2$ is an aromatic hydrocarbon radical; the m-phenylene and bis(4-phenylene)methane radicals are particularly preferred.

The sulfonate-terminated polymers of this invention may contain polyimide linkages, wherein $X^1$ and $Y^1$ together form N; polyamic acid linkages, wherein $X^1$ is OH and $Y^1$ is NH; or a mixture thereof. As noted herein, the polyamic acids are generally obtained as intermediates in polyimide preparation and the polyimides are preferred as the final products.

The numerical value of n is at least 5 and is most often no greater than about 45. Average values from about 15 to about 35 are preferred.

Methods for the preparation of polyimides and polyamic acids by the reaction of dianhydrides with diamines are known in the art. A somewhat different method, comprising the reaction of a diamine with a bisimide of an amine containing an electron-deficient radical, is disclosed in copending, commonly assigned application Ser. No. 505,636, filed June 20, 1983, the disclosure of which is incorporated by reference herein. It has been discovered that the sulfonate-terminated polymers of the present invention may be prepared by the reaction of dianhydrides or bisimides with diamines and aminosulfonic acids. Accordingly, another aspect of the present invention is a method for preparing a sulfonate-terminated polymer as disclosed hereinabove which comprises reacting (A) at least one difunctional compound of formula VIII, wherein A is as previously defined, $Y^2$ is O or N-Z, and Z is a highly electron-deficient group; with a mixture of (B) at least one diamine of formula VII, wherein $R^2$ is as previously defined; and (C) at least one aminosulfonic acid of formula IX, wherein $R^1$ is as previously defined.

Reagent A in the method of this invention may be a dianhydride ($Y^1$ is O) or a bisimide ($Y^2$ is N-Z) corresponding to one or more of the tetracarboxylic acids of formula II described hereinabove. If it is a bisimide, the Z value is a highly electron-deficient group. Generally, Z is derived from an amine Z-NH$_2$ which comprises at least 10 mole percent, most often at least about 30 mole percent and preferably at least about 50 mole percent, of the free amine constituents of an equilibrated mixture from the reaction represented by equation X.

It is preferred that the amine Z-NH$_2$ have a boiling point at atmospheric pressure less than about 300° C., usually less than 250° C., more preferably less than about 210° C. and most desirably less than 180° C. A maximum boiling point of about 300° C. is mandatory, and the above-noted lower boiling points still more preferred, when said amine comprises less than about 75 mole percent of the free amine constituents of the equilibrated mixture. The lower boiling points are preferred in order that the equilibrium may be easily shifted in favor of polyimide formation during reaction with a diamine.

Methods for bringing the reaction represented by equation VI to equilibrium and analyzing the equilibrated mixture will be apparent to those skilled in the art. In a typical method, a mixture of 0.005 mole each of aniline and the N-(Z-substituted) phthalimide is placed in a 10-ml. stainless steel reactor which is the purged with nitrogen, sealed and heated at 250° C. for one hour in a constant temperature bath. The tube is then removed, cooled and opened and the reaction mixture is sampled and analyzed by high pressure liquid-liquid chromatography.

The principal chemical characteristic of the Z value is its high degree of electron deficiency. For the most part, suitable electron-deficient groups comprise aromatic hydrocarbon radicals containing one or more strongly electron-withdrawing substituents and heterocyclic radicals having aromatic character.

Suitable aromatic hydrocarbon radicals include phenyl, naphthyl and the like containing such substituents as halo, nitro, keto, carbalkoxy, cyano and perfluoroalkyl. At least one of said electron-withdrawing substituents is preferably ortho or para to the free valence bond (i.e., the one attached to the amino group in Z-NH$_2$). The trifluoromethylphenyl radicals are particularly preferred.

Suitable heterocyclic radicals having aromatic character include those with 5- or 6-membered rings and aromatic unsaturation of the type existing in pyrrole and pyridine. These radicals preferably contain 1–3 and especially 1 or 2 hetero atoms of which at least one is nitrogen and the others, if present, are nitrogen or sulfur. They are usually unsubstituted but may be substituted, especially with electron-withdrawing substituents such as those previously enumerated. The free valence bond is preferably in the 2- or 4-position with respect to a hetero atom. If the ring contains more than one hetero atom and especially if it is 5-membered, the free valence bond is preferably attached to the single carbon atom between two of said hetero atoms.

Illustrative 5-membered heterocyclic radicals are pyrrolyl, 2-thiazolyl, 2-imidazolyl and 2-(1,3,4-thiadiazolyl). Illustrative 6-membered radicals are 2-pyridyl, 3-pyridyl, 4-pyridyl, 2-pyrimidyl, 2-pyrazyl, 2-(1,4-thiazolyl) and 2-(1,3-thiazolyl). Particularly preferred Z values are the aminopyridyl radicals, especially 2-pyridyl and 4-pyridyl.

It is especially preferred that reagent A be a dianhydride; that is, that Z be O. Most preferably, it is bisphenol A dianhydride.

The diamines useful as reagent B are those previously enumerated and described. Particularly preferred are m-phenylenediamine and 4,4'-diaminodiphenylmethane.

Reagent C, the aminosulfonic acid, is characterized by an $R^1$ value as previously described linking the amino with the sulfonate group. The preferred $R^1$ values are p-phenylene, m-phenylene and ethylene, with ethylene being particularly preferred. Thus, the particularly preferred aminosulfonic acid is 2-aminoethanesulfonic acid, also known as taurine.

An initial reaction between reagents A, B and C to form a polymer containing predominantly amic acid groups (i.e., wherein X is OH and $Y^1$ is NH) may occur at temperatures as low as about 25° C. In general, temperatures no higher than about 100° C. are required for polyamic acid formation. Substantially complete conversion to a polyimide (in which X and $Y^1$ taken together are N) generally takes place at temperatures up to about 250° C., most often about 125°–200° C. As pointed out hereinafter, it may under certain circumstances be desirable to obtain and isolate the polyamic acid as an intermediate in polyimide formation. If so, the reaction temperature should be regulated accordingly. If polyamic acid formation is not desired, the reaction mixture may simply be heated at a temperature within the range of about 125°–250° C., preferably about 140°–200° C., until the reaction is complete.

Polymerization may be effected in bulk, especially when $R^1$ is aliphatic, or in solution in a suitable solvent, typically an aromatic hydrocarbon such as toluene or xylene, a chlorinated aromatic hydrocarbon such as chlorobenzene or o-dichlorobenzene, or a polar aprotic solvent such as dimethylformamide, dimethylacetamide, dimethyl sulfoxide or N-methylpyrrolidone. Mixtures of these solvents may also be used. For polyimide formation, the use of a mixture containing at least one solvent which forms an azeotrope with water (e.g., toluene), usually in an amount up to about 20% by weight, is often preferred. In general, the use of polar aprotic solvents or mixtures thereof with azeotrope-forming solvents is preferred since conversion to a polymer containing a relatively high proportion of sulfonate groups is promoted thereby. When the reaction is effected in bulk, the use of extrusion and/or wiped film techniques may be advantageous.

The ratio of equivalents of amine reagents (reagents B and C combined) to reagent A is generally between about 0.9:1 and about 1.2:1. In general, polymers of higher molecular weight are obtained by employing ratios equal to or very close to 1:1. For the purposes of this invention, the equivalent weight of a dianhydride is half its molecular weight, and the equivalent weight of an amine is its molecular weight divided by the number of primary amine groups therein.

A number of factors affect the nature of the polymer obtained by the above-described reaction. In the first place, aminosulfonic acids in which $R^1$ is aliphatic are more completely incorporated in the polymer than those in which it is aromatic. If $R^1$ is aromatic, incorporation is optimized when the amino and sulfonic acid groups are in the meta as opposed to the para positions. It is believed that ease of incorporation varies directly with the nucleophilicity of the amine group, which is dependent on the molecular structure of the attached moiety.

In the second place, quantitative incorporation of reagent C into the polymer is generally not achieved. Most often, incorporation is on the order of about 10–70%, based on a comparison of actual and calculated sulfur percentages. Again, aliphatic aminosulfonic acids are generally superior in this respect, frequently achieving incorporation of 50% or greater.

In the third place, since reagent C is in the nature of an endcapping agent, the molecular weight of the polymer obtained will vary inversely with the proportion of reagent C in the reaction mixture. Similarly, the proportion of sulfonate groups will vary inversely with the molecular weight of the polymer. In order to obtain a polymer having the desired properties of solvent resistance and thermal stability, reagent C should generally constitute about 2–15% and preferably about 5–7% of the total equivalents of amine reagents in the reaction mixture. The number average molecular weight of the product thus obtained is typically within the range of about 10,000–50,000.

The above-described procedure produces sulfonate-terminated polymers in which M is hydrogen; that is, free sulfonic acids. Such polymers may be converted to salts by conventional methods involving reaction with inorganic or organic bases. For example, the free sulfonic acids may be converted to sodium and zinc salts by reaction with sodium hydroxide and zinc oxide, respectively.

The invention is illustrated by the following examples. All parts and percentages are by weight. Intrinsic viscosities were determined in chloroform at 25° C.

EXAMPLE 1

A mixture of 91 parts (350 meq.) of bisphenol A dianhydride, 16 parts (300 meq.) of m-phenylenediamine and 2.88 parts (17 meq.) of p-aminobenzenesulfonic acid was prepared in a helicone reactor (a laboratory-scale reactor simulating extrusion conditions). An exothermic reaction took place and the temperature rose rapidly to 48° C. The mixture was heated to 264° C. for 55 minutes and was then extruded. There was obtained a black polymer which was dissolved in chloroform, filtered and reprecipitated by the addition of methanol. The reprecipitated polymer contained 0.06% sulfur.

EXAMPLE 2

A solution of 40.56 parts (156 meq.) of bisphenol A dianhydride, 8.21 parts (152 meq.) of m-phenylenediamine and 0.713 part (4 meq.) of p-aminobenzenesulfonic acid in 225 parts of o-dichlorobenzene was heated to 200° C. under nitrogen, with stirring, as water was removed by distillation. After 2 hours, the water collection trap was filled with activated 4-Angstrom molecular sieves. Refluxing was continued for a total of 18 hours, after which the solution was cooled and diluted with chloroform. The polymer was precipitated by pouring the solution into methanol, with vigorous mixing. The product, an off-white powder, was collected by vacuum filtration and dried by heating at 160° C. under vacuum for 2 hours. It contained 0.04% sulfur and had an intrinsic viscosity of 0.605 dl./g. and a Tg of 227.2° C.

EXAMPLE 3

A solution of 81 parts (310 meq.) of bisphenol A dianhydride, 16.4 parts (304 meq.) of m-phenylenediamine and 8.8 parts (51 meq.) of p-aminobenzenesulfonic acid in a mixture of 205.2 parts of N-methylpyrrolidone and 26 parts of toluene was heated under reflux, with stirring, for 18 hours, with molecular sieves being added after 2 hours as in Example 2. The solution was cooled and diluted with chloroform, whereupon a brown, gummy mass was deposited. The liquid was decanted and chloroform was added to the residue. The resulting mixture was heated under reflux until homogenous and the polymer was precipitated by pouring into methanol and isolated as in Example 2. It contained 0.11% sulfur and had an intrinsic viscosity of 0.315 dl./g. and Tg of 222.8° C.

EXAMPLE 4

A solution of 81.1 parts (310 meq.) of bisphenol A dianhydride, 15.97 parts (296 meq.) of m-phenylenediamine, 2.08 parts (17 meq.) of 2-aminoethanesulfonic acid and 3.08 parts of tri-n-butylamine in 235 parts of o-dichlorobenzene was heated and product isolated as described in Example 2. The polymer contained 0.07% sulfur and had an intrinsic viscosity of 0.380 dl./g.

EXAMPLES 5–6

Solutions of bisphenol A dianhydride, m-phenylenediamine and 2-aminoethanesulfonic acid in 153.9 parts of N-methylpyrrolidone and 34.7 parts of toluene where heated under reflux and product isolated as described in Example 2. The proportions of reagents and analytical results for the products are given in the following table.

|  | Example 5 | 6 |
| --- | --- | --- |
| Bisphenol A dianhydride, meq. | 156 | 156 |
| m-Phenylenediamine, meq. | 148 | 152 |
| 2-Aminoethanesulfonic acid, meq. | 8 | 4 |
| Sulfur, % | 0.34 | 0.14 |
| Intrinsic viscosity, dl./g. | 0.345 | 0.435 |
| Tg, °C. | 223.4 | 226.9 |

EXAMPLE 7

The procedure of Example 5 was repeated, substituting an equivalent amount of m-aminobenzenesulfonic acid for the 2-aminoethanesulfonic acid. The product contained 0.17% sulfur and had an intrinsic viscosity of 0.235 dl./g.

EXAMPLE 8

The procedure of Example 5 is repeated, substituting an equivalent amount of bis(3,4-dicarboxyphenyl) sulfone dianhydride for 78 meq. of the bisphenol A dianhydride. A similar product is obtained.

EXAMPLE 9

The procedure of Example 5 is repeated, substituting an equivalent amount of bis(4-aminophenyl)methane for the m-phenylenediamine. A similar product is obtained.

EXAMPLE 10

The procedure of Example 5 is repeated, substituting an equivalent amount of 1,3-bis(3-aminopropyl)tetramethyldisiloxane for the m-phenylenediamine. A similar product is obtained.

The products of this invention have properties similar to those of corresponding polyimides containing no sulfonic acid groups. Thus, they may be used similarly, either alone or in combination with conventional polyetherimides to increase still further their solvent resistance. Typical uses are in the formation of films, molding compounds, coatings and the like, in such areas of application as automobile and aviation applications for decorative and protective purposes, high temperature electrical insulators and dielectric capacitors, coil and cable wrappings, containers and container linings, laminating structures for application as films to various heatresistant or other types of materials, and filled compositions where the fillers may be asbestos, mica, glass fiber or the like. Other uses include as binders for asbestos fibers, carbon fibers and other fibrous materials making brake linings, and for formulation of molding compositions using fillers such as asbestos, glass fibers, talc, quartz, wood flour, finely divided carbon and silica. Still other uses for polyimides are described in a large number of U.S. patents.

The compositions of this invention, especially those in the salt form, are also useful as compatibilizers for impact-modified blends of substantially aromatic polymers such as polycarbonates, polyphenylene oxides, saturated aromatic polyesters and polyetherimides with ionomeric elastomers, as described in the aforementioned applications Ser. Nos. 619,431 and 619,433. An illustration of this utility is provided by the following example.

EXAMPLE 11

A blend was prepared from the following:

82 parts of a polyetherimide having a molecular weight of about 20,000 and an intrinsic viscosity in chloroform at 25° C. of 0.47 dl./g., prepared by the reaction of approximately equimolar quantities of bisphenol A dianhydride and m-phenylenediamine.

9 parts of "Uniroyal IE-2590", a commercially available zinc sulfonate derived from a sulfonated EPDM rubber having a number average molecular weight of about 50,000 and containing an average of 13 sulfonate groups per molecule.

9 parts of the zinc salt of the product of Example 5, prepared by neutralizing said product with a solution of zinc acetate in aqueous methanol.

The composition is prepared by blending the above, mixing in a jar mill for 2 hours and extruding on a twin screw extruder. The extruded material is quenched in water, pelletized and dried.

What is claimed is:

1. A sulfonate-terminated polymer having formula I in the drawings, wherein M is one equivalent of a cation; A is a tetravalent aromatic radical; $R^1$ is a divalent aliphatic or aromatic radical; $R^2$ is an aromatic hydrocarbon radical containing about 6–20 carbon atoms or a halogenated derivative thereof, an alkylene or cycloalkylene radical containing about 2–20 carbon atoms, or a bis-alkylenepoly(dialkylsiloxane) radical; in each individual instance, $X^1$ is OH and $Y^1$ is NH, or $X^1$ and $Y^1$ taken together are N; and n is at least about 5.

2. A polymer according to claim 1 wherein M is hydrogen and $R^1$ is a divalent lower hydrocarbon radical.

3. A polymer according to claim 2 wherein A has formula III; Q has formula IV, V or VI; each $R^3$ is independently hydrogen or methyl; $R^4$ is a straight chain or branched alkylene radical containing 1–5 carbon atoms; and each $X^2$ is independently hydrogen or halogen.

4. A polymer according to claim 3 wherein $X^1$ and $Y^1$ taken together are N and $R^2$ is an aromatic hydrocarbon radical.

5. A polymer according to claim 4 wherein $R^1$ is an alkylene radical containing about to about 4 carbon atoms wherein the free valence bonds are attached to vicinal carbon atoms.

6. A polymer according to claim 5 wherein Q has formula VI, $R^4$ is isopropylidene and each $X^2$ is hydrogen.

7. A polymer according to claim 6 wherein $R^2$ is m-phenylene or bis(4-phenylene)methane.

8. A polymer according to claim 7 wherein $R^1$ is ethylene.

9. A polymer according to claim 8 wherein the average value of n is from about 15 to about 35.

10. A method for preparing a polymer according to claim 1 which comprises reacting (A) at least one difunctional compound of formula VIII, wherein $Y^2$ is O or N-Z and Z is a highly electron-deficient group, with a mixture of (B) at least one diamine of formula VII and (C) at least one aminosulfonic acid of formula IX.

11. A method according to claim 10 wherein M is hydrogen and $Y^2$ is O.

12. A method according to claim 11 wherein reagent C constitutes about 2–15% of the total equivalents of amine reagents in the reaction mixture.

13. A method according to claim 12 wherein $R^1$ is a lower hydrocarbon radical.

14. A method according to claim 13 wherein A has formula III; Q has formula IV, V or VI; each $R^3$ is hydrogen or methyl; $R^4$ is a straight chain or branched alkylene radical containing 1–5 carbon atoms; and each $X^2$ is independently hydrogen or halogen.

15. A method according to claim 14 wherein $R^2$ is an aromatic hydrocarbon radical.

16. A method according to claim 15 wherein the reaction is effected in solution in a mixture of a polar aprotic solvent and a solvent which forms an azeotrope with water.

17. A method according to claim 16 wherein $R^1$ is an alkylene radical containing up to about 4 carbon atoms wherein the free valence bonds are attached to vicinal carbon atoms, Q ha formula VI, $R^4$ is isopropylidene and each $X^2$ is hydrogen.

18. A method according to claim 17 wherein $R^2$ is m-phenylene or bis(4-phenylene)methane.

19. A method according to claim 18 wherein the reaction temperature is within the range of about 125°–250° C. and the product is a polyimide.

20. A method according to claim 19 wherein $R^1$ is ethylene.

* * * * *